United States Patent [19]

Gottschalk et al.

[11] 4,298,149
[45] Nov. 3, 1981

[54] BODY HARNESS FOR CINEMATOGRAPHER

[75] Inventors: Robert E. Gottschalk, Los Angeles; Felipe Navarro, Granada Hills, both of Calif.

[73] Assignee: Panavision, Incorporated, Tarzana, Calif.

[21] Appl. No.: 103,047

[22] Filed: Dec. 13, 1979

Related U.S. Application Data

[63] Continuation of Ser. No. 870,132, Jan. 17, 1978, abandoned.

[51] Int. Cl.³ ............................................. G03B 17/00
[52] U.S. Cl. .................................... 224/201; 224/262; 224/908; 352/243
[58] Field of Search ............... 224/201, 224, 265, 266, 224/271, 908, 204, 211, 213, 215, 257, 262, 151, 157, 214, 185; 352/243; 354/82, 293; 350/72

[56] References Cited

U.S. PATENT DOCUMENTS

| 2,676,207 | 4/1954 | Hunt | 224/262 X |
| 4,017,168 | 4/1977 | Brown | 352/243 |
| 4,037,763 | 7/1977 | Turchen | 224/908 X |
| 4,099,657 | 6/1978 | Zufich | 224/262 |
| 4,158,489 | 6/1979 | Gottschalk et al. | 224/908 X |
| 4,158,490 | 6/1979 | Gottschalk et al. | 224/908 X |
| 4,206,983 | 6/1980 | Nettman et al. | 224/201 X |

Primary Examiner—Steven M. Pollad
Attorney, Agent, or Firm—Lyon & Lyon

[57] ABSTRACT

A two-part harness for a motion picture or television cameraman has an upper part for engagement of the cameraman's shoulders and upper back, and a lower part engaging the cameraman's hips. The harness is used to support the weight of the camera and associated apparatus positioned in front of the cameraman, but the harness functions to place most of the vertical load on the hips and most of the horizntal load on the shoulders and upper back. The two parts of the harness are connected for vertical adjustment by the cameraman while wearing the harness.

7 Claims, 9 Drawing Figures

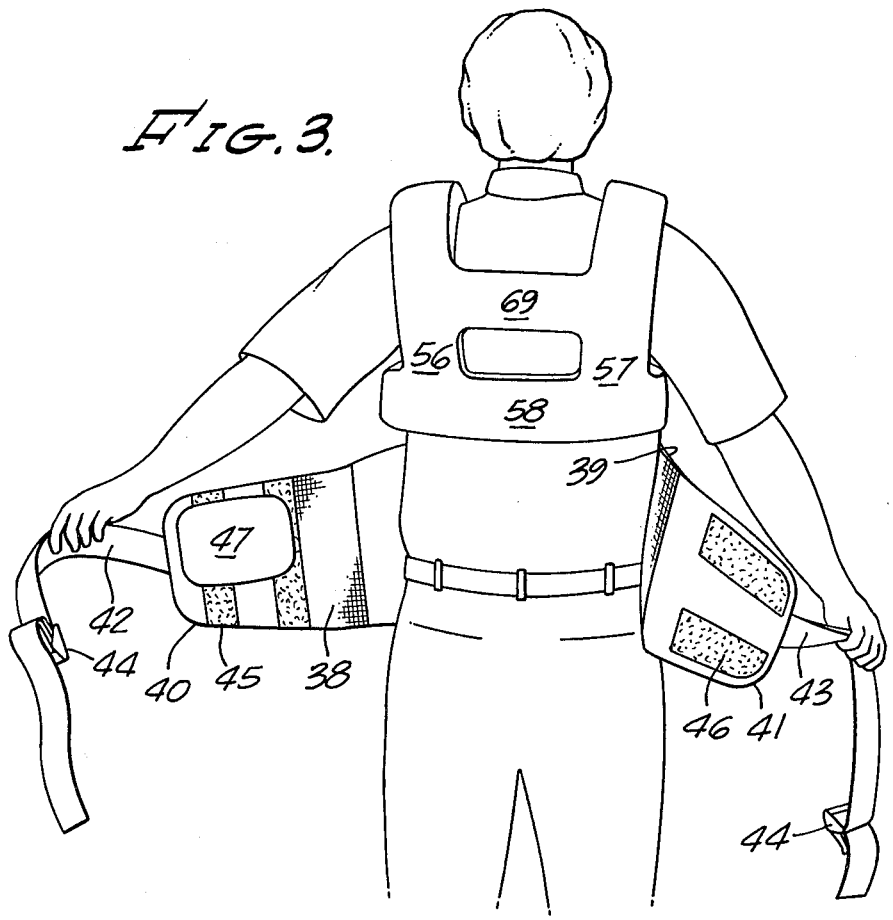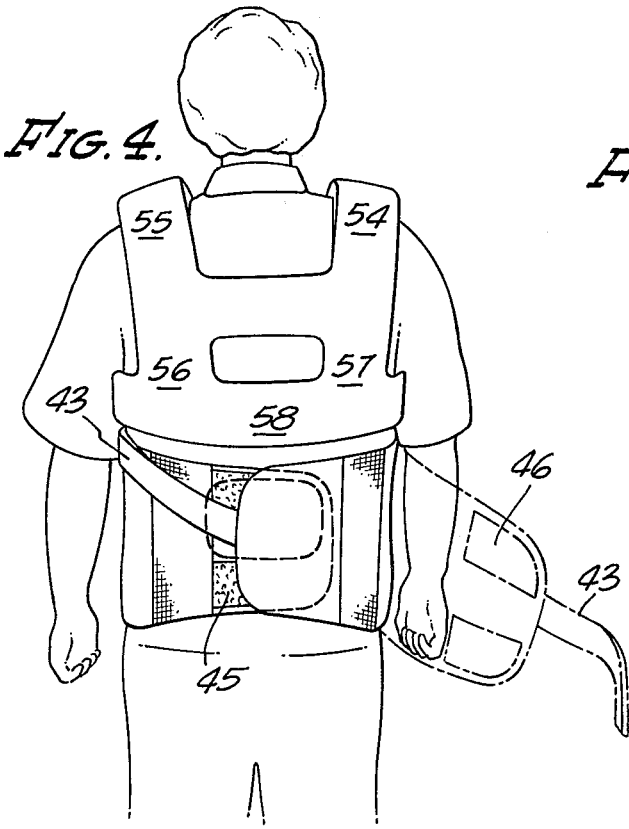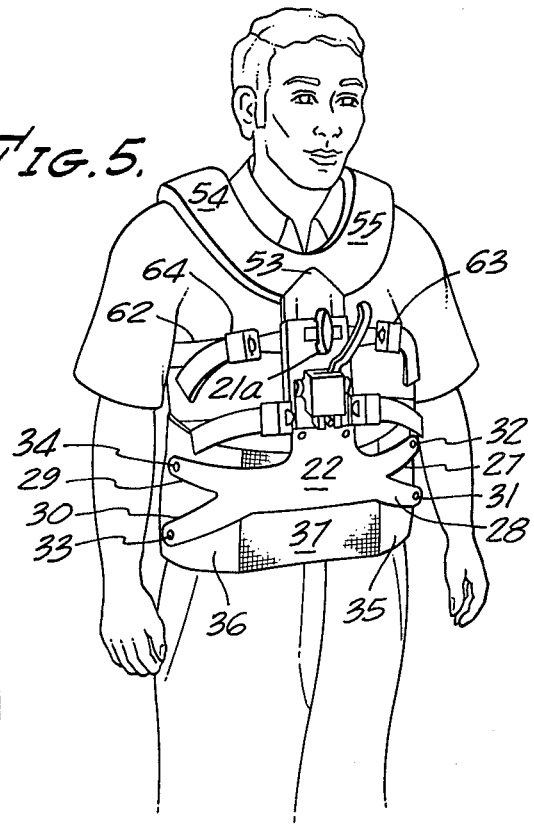

BODY HARNESS FOR CINEMATOGRAPHER

This is a continuation, of application Ser. No. 870,132, filed Jan. 17, 1978, now abandoned This invention relates to body-mounted support devices for professional motion picture or television cameras and is particularly directed to a body harness which may be worn by a cameraman or camera operator or other person, to distribute the weight of the camera and associated mechanism onto the hips of the operator instead of his shoulders, thus permitting the operator to carry the camera for long periods without becoming unduly fatigued. Present day motion picture techniques often employ a variety of complex action shots. In many instances, the release print shown theatergoers is a representation of the scene from the actor's viewpoint, as if, for example, he was running, jumping or performing some other activity. Frequently, these shots require that the cameraman duplicate the activities the actor is performing. Thus, if the actor is leaping over a ditch, the cameraman must also perform this task if a true representation from the actor's vantage point is to be provided.

There is a major distinction that differentiates the actor's activities from the cameraman's, however, and this distinction renders the filming of these scenes very difficult. The actor's agility is much greater than the cameraman's, for the actor, unlike the cameraman, is not encumbered by the additional weight of the camera and associated apparatus. Another consideration is also present, however. Even where difficult action scenes are not being filmed, the tight schedules often employed by many studios often require the cameraman to carry the camera for long periods without relief from his weighty burden. While hand-held motion picture cameras have been used professionally with considerable success, it will be appreciated that much of this success depends on such difficult to gauge variables as the individual skill and stamina of the camera operator. In addition, any difficulty the cameraman may encounter in filming the action is frequently not discovered until long after the filming has ended.

The apparatus of the present invention permits the cameraman to eliminate many of these variables that tend to distort the filmed scenes and reduce the fatigue engendered by the heavy camera equipment. This is accomplished by a novel harness which distributes the weight of the camera about the body of the cameraman with the major portion of the weight resting on his hips rather than upon his shoulders and back. Also, this harness permits the camera to be held at eye level without the necessity that the cameraman carry the camera in front of him with his hands. Thus, the harness helps free his hands to permit better operation of the camera.

The problems encountered in the motion picture industry where heavy camera apparatus is employed may be substantially reduced by means of a harness constructed according to this invention. The harness of this invention permits the camera operator to hold the camera in front of him with its weight supported for long periods of time on the hips without placing undue stress on the back, shoulders or other easily fatigued parts of the body. The camera assembly may be easily connected to the harness by any suitable means, preferably, however, by a vertical support tube which is mounted to turn on a gimbal device. Articulated arm assemblies with pneumatic cushion devices are serially connected to support the gimbal device upon the body harness. These assemblies are more fully disclosed in the Gottschalk et al U.S. Pat. No. 4,158,488 granted June 19, 1979.

Other and more detailed objects and advantages will appear hereinafter.

BRIEF DESCRIPTION OF THE DRAWINGS

FIG. 3 is a rear view of the harness as worn by the cameraman before the rear straps are secured in place.

FIG. 4 is similar to FIG. 3 with the left strap secured.

FIG. 5 shows a front view of the harness of the present invention when worn by the cameraman.

DETAILED DESCRIPTION OF THE DRAWINGS

Figure 1:
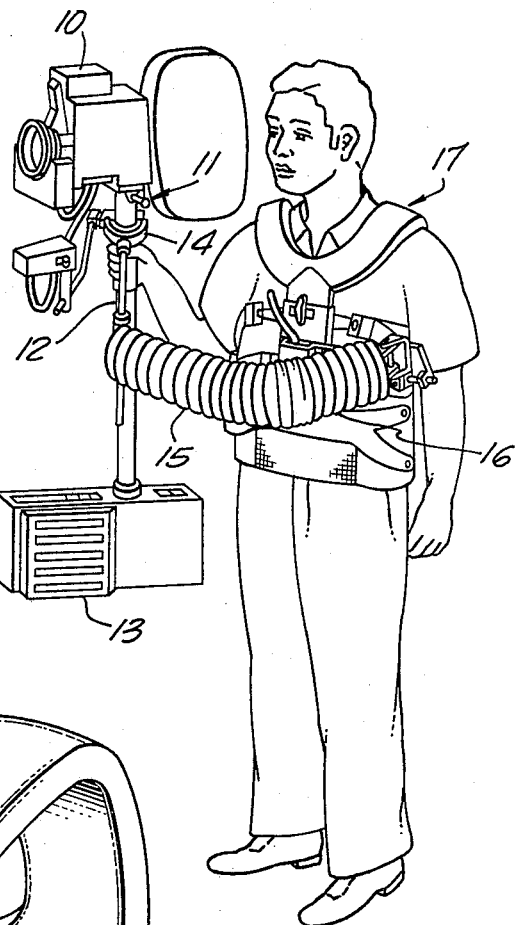
FIG. 1 is a perspective side elevation showing a preferred embodiment of this invention with the camera assembly mounted on the harness.

With reference to the drawings, FIG. 1 shows a cameraman supporting a motion picture camera assembly generally designated 10 mounted on a free-floating support mechanism 11 which includes a camera support tube member 12, battery carrier 13, gimbal device 14, a pair of articulated arm assemblies 15 and 16. All this is carried by the body harness 17 according to the present invention.

Figure 2:
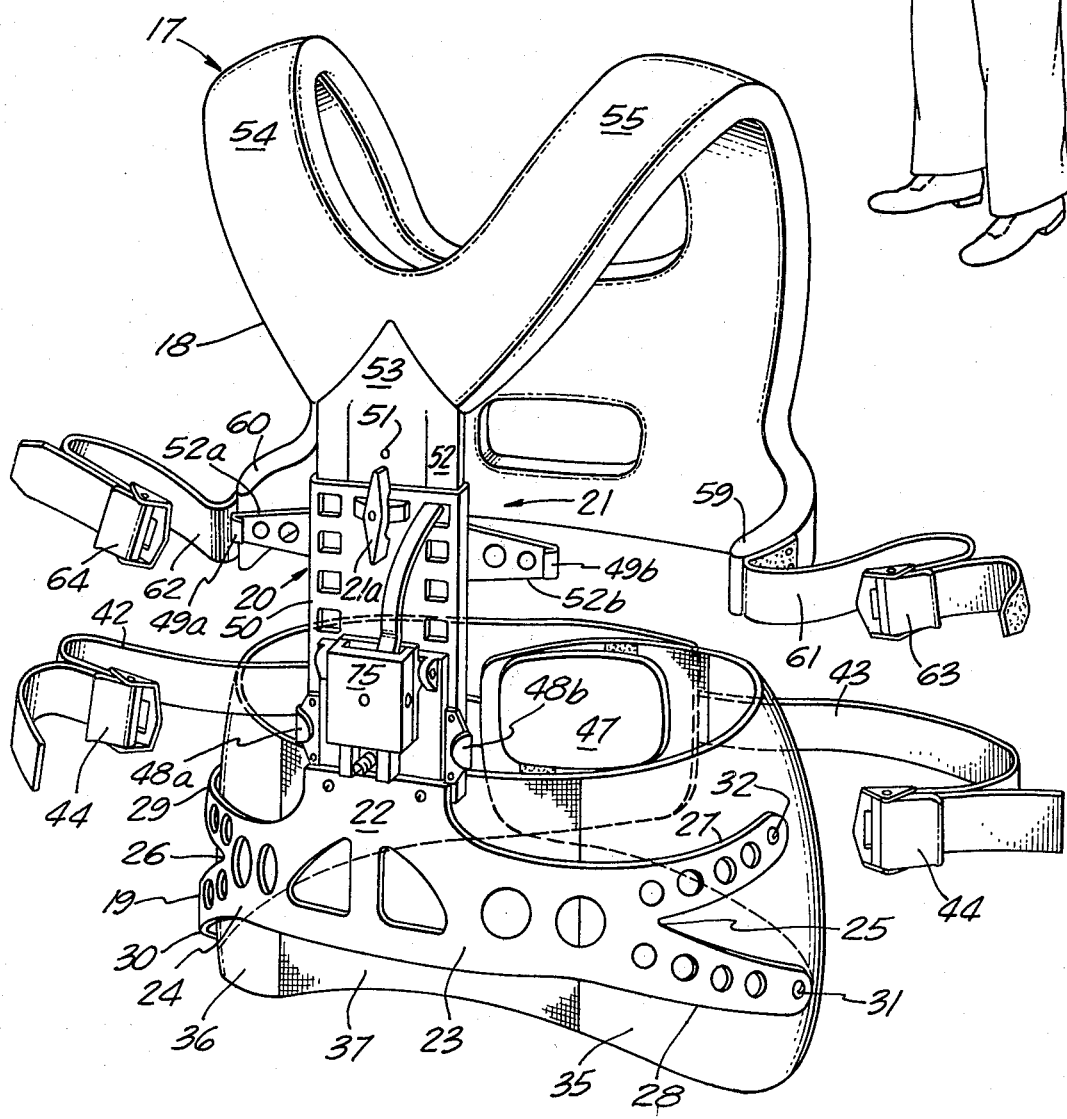
FIG. 2 is a side elevation partly in section showing the harness of the present invention before it is secured about the body of the cameraman.

As best shown in FIG. 2, the harness 17 is comprised of a pair of connectable frame members, a shoulder frame member 18 and a hip frame member 19. The members are joined about a center portion 20 by a connector assembly 21. This connector assembly 21 is preferably adjustable to permit proper fitting of the harness to the particular dimensions of the wearer. As shown in FIG. 2, the hip frame member has a center section 22 which is positioned in front of the cameraman toward his lower abdomen. The center section 22 has curved structural metal parts 23 and 24 extending laterally to encompass the hips of the cameraman. Each part branches at 25 and 26, thus forming two pairs of diverging ribs 27 and 28, 29 and 30, as is more clearly depicted in FIG. 5. Connected by suitable means to the ribs 27 and 28 on one side is a resilient pad 35 and to ribs 29 and 30 on the other side is a resilient pad 36 with the pads 35 and 36 joined by a front mesh portion 37. It is preferred that each pad (35 and 36) be mounted by a pair of vibration isolating mounts 80 at points, 31, 32, 33 and 34 on the ends of the ribs 27, 28, 29 and 30, respectively, which mounts 80 are each connected to a thin triangular plastic plate 81 that is in turn attached to a thicker oval plate 82 that supports the pad (35 or 36), see FIGS. 6, 8 and 9. This preferred mounting serves to flexibly and comfortably support the hip frame 19 on the wearer's hips. The resiliency of the pad permits the cameraman to maneuver easily while operating the camera and associated apparatus without binding, while the padding protects the wearer from the rigid frame. The center mesh portion reduces weight and helps keep the cameraman cool when the circumstances require it.

Extending toward the rear of the harness from the resilient padding is an additional portion of meshed material 38 and 39, more clearly shown in FIGS. 3 and 4 which terminate in end portions 40 and 41. End portions 40 and 41 have straps 42 and 43 with each having a suitable fastening means 44 such as a buckle joined thereto. These straps may be adjusted in length to fit the different dimensions of various individuals. Both sides of one end portion 40 are provided with a self-adhesive material 45 known as Velcro, or other suitable separable and adjustable fastening means, while the other end portion 41 has Velcro or a similar material 46 only on its inner surface. The Velcro material in addition to permitting the cameraman to be securely strapped in the harness without the unnecessary use of an additional heavy metal fastening means that will add to the weight of the apparatus, is an adhesive means in which the bond may be readily broken and re-formed innumerable times without the need for a reapplication of the adhesive material. End portion 40 having adhesive material on both sides is adapted to have attached thereto on its inner surface, a free resilient pad 47. This pad 47 may be provided with adhesive material on one surface to permit adhesion to the Velcro on the end portion 40. This pad 47 is positioned such that it rests on the lumbar or small of the cameraman's back.

In securing the harness in place on the cameraman, the first end portion 40 having Velcro material on both sides and with the separate resilient pad 47 held in place, is positioned such that the resilient pad is in the small of the cameraman's back. The strap 42 is drawn around the cameraman toward the front of the harness where it is hooked over the projection 48a. The second end portion 41 with Velcro on its inner surface is placed over the outer Velcro surface of the first end portion 40, thus forming a secure connection. This free strap 43 is also drawn around the cameraman toward the front of the harness where it is hooked over the projection 48b. In this manner the end portion 41 is now attached by Velcro to the other end portion 40 to which the resilient lumbar pad 47 is attached and any tightening of the straps 42 and 43, either for adjustment or during use by bending, causes a pressure to be applied by pad 47 to the wearer's lumbar area without any tightening of the waist band formed by the mesh portions 37, 38 and 39 and pads 35 and 36.

For the shoulder frame 18, the chest straps 62 and 61 are connected to the hook projections 49a and 49b, respectively. Once the fastening means of each strap is joined with the fastening means on the body of the harness, each strap is adjusted to permit a comfortable fit. Preferably, the straps should be as taut as the cameraman can comfortably endure.

Mounted on the center portion 22 is a central upstanding plate 50 which contains a suitable means of attaching the camera apparatus to the harness. A releasable latch mechanism generally designated 75 is operated by the lever 76 to connect the camera apparatus to the block 77 carried on the plate 50. Details of this mechanism are disclosed in said U.S. Pat. No. 4,158,488.

The shoulder member of the harness connects with the hip member by the connector assembly 21 including any suitable connecting means 21a such as a winged threaded bolt which screws through threaded block 50a into any one of a series of holes 51 in the central depending frontal plate 52 in the shoulder member of the harness. This plate branches at 53 into two support members 54 and 55 which rest on the shoulders of the cameraman. Preferably, this should be padded to ensure a comfortable fit. These extend from the center of the cameraman's chest over the shoulders, to approximately the midpoint between the cameraman's shoulder and his waist. At approximately points 56 and 57 the support members are connected to a transverse member 58 which extends from the center of the back and along the sides of the cameraman for a short distance. In the preferred embodiment this transverse member is both resilient and padded as are the two shoulder members. The lower wing portions 59 and 60 each terminate in a chest strap 61 and 62 each having an adjustable fastening means 63 and 64 such as a buckle. The loose end of each strap may be secured to the remainder of the strip by means of a suitable adhesive material such as Velcro.

Figure 6:
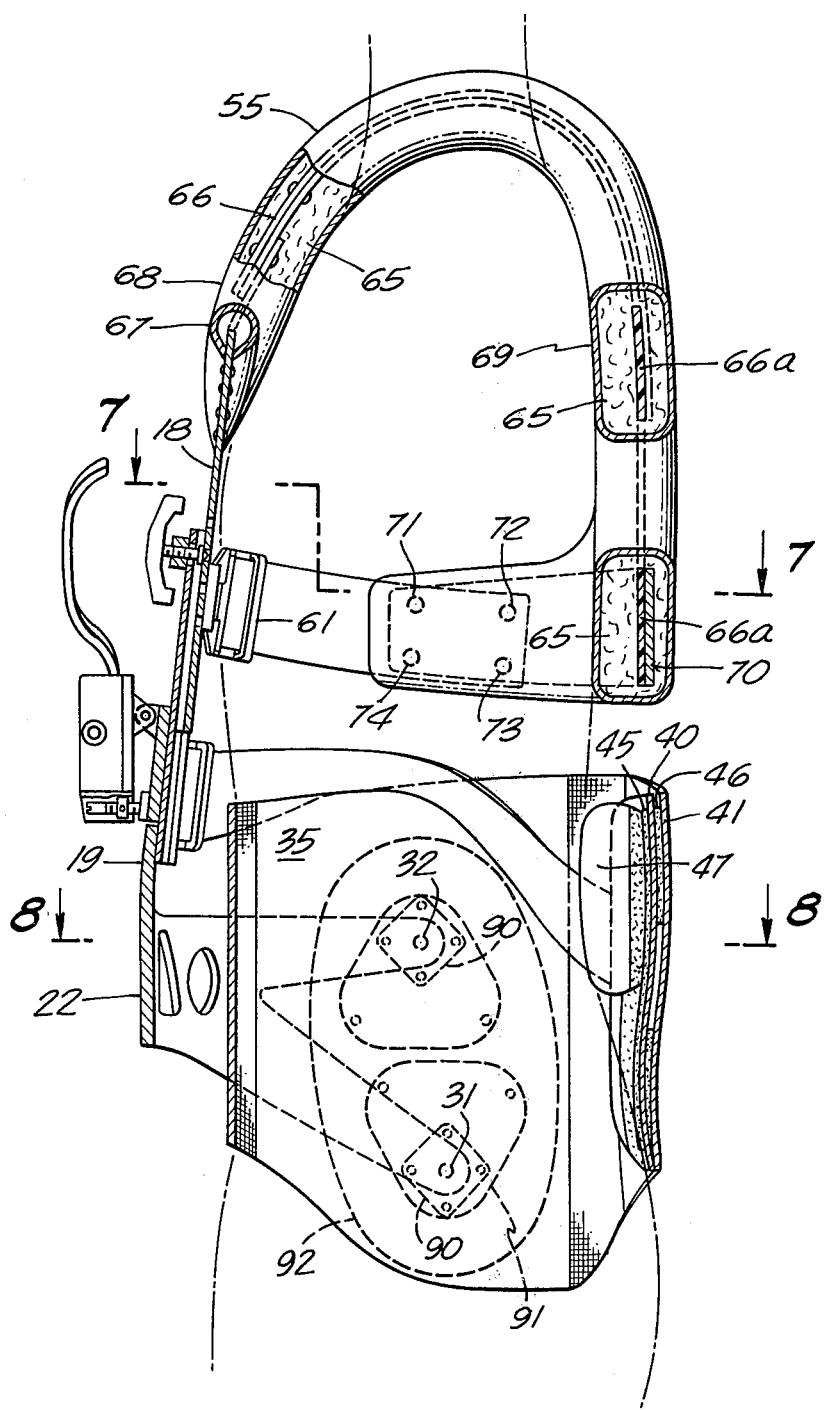
FIG. 6 is a side elevation, partly in section, showing the harness of the present invention.

With reference to FIG. 6, there is shown a cutaway side view of the article of the present invention as it appears in position on the camera operator. The hip member 19 shows the relative positioning of the center section 22 with reference to resilient pad 35 having the preferred configuration of the inner padding member outlined. The separate resilient pad 47 is shown in place at the small of the back with its Velcro surface joined to the corresponding Velcro surface 45 of end portion 40. The outer Velcro surface of end portion 40 is also joined to end portion 41's Velcro inner surface 46, as previously described.

Figure 7:
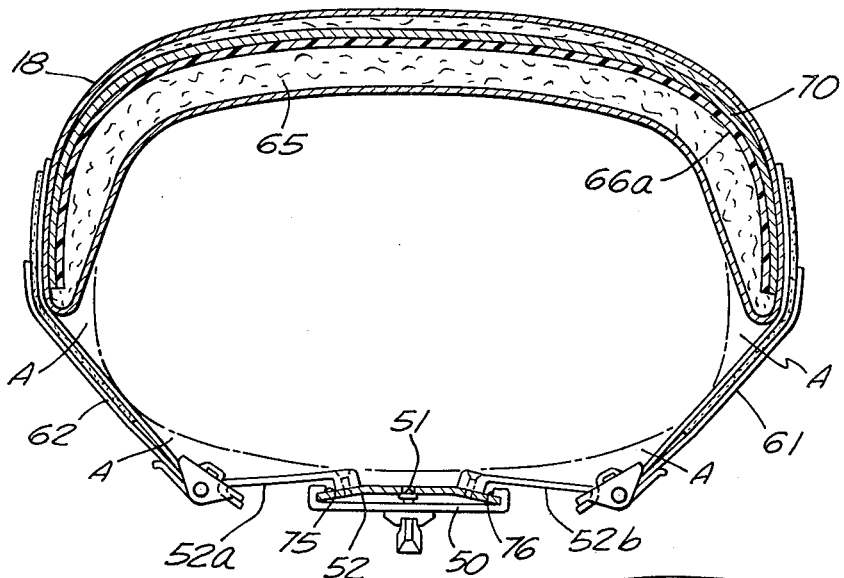
FIG. 7 is a transverse sectional detail taken substantially on the line 7—7 as shown in FIG. 6.

In regard to the shoulder member 18, in FIG. 6 the support member 55 is shown in a cutaway view more clearly denoting the configuration of padding 65 about relatively rigid member 66. This member is preferably a plastic material that remains in the general curved shape exhibited in FIG. 6 yet having sufficient flexibility to provide the wearer with a degree of maneuverability within the harness. It may be readily seen that plate 52 extends upwardly where it is joined to relatively rigid member 66 by an appropriate device 67. Padding 65 extends along the length of support member 66 and for a short distance along plate 52. The padding may be covered by any suitable fabric 68. To increase the strength of the harness, a second transverse member 69 is positioned above transverse member 58. Both members include transverse portions 66a of frame member 66. A relatively rigid reinforcing member 70, preferably of metal, is positioned within the transverse support member 58 and extends around the side as shown in FIGS. 6 and 7. This rigid reinforcing member is surrounded by a suitable padding 65 and covered by fabric. Straps 61 and 62 may be joined to the support member by any suitable means such as fasteners 71–74.

Figure 8:
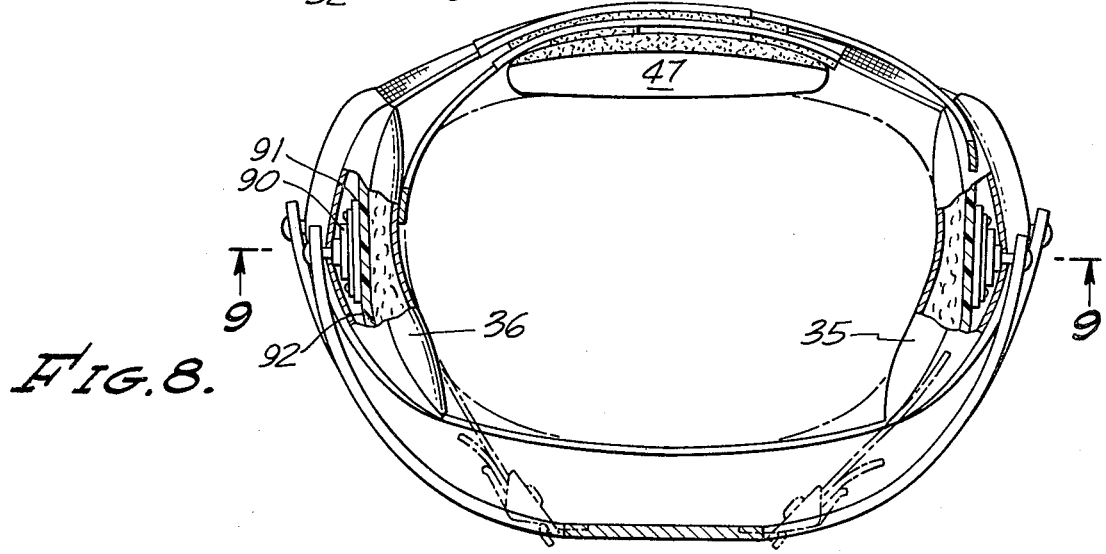
FIG. 8 is a transverse sectional detail taken substantially on the line 8—8 as shown in FIG. 6.
Figure 9:
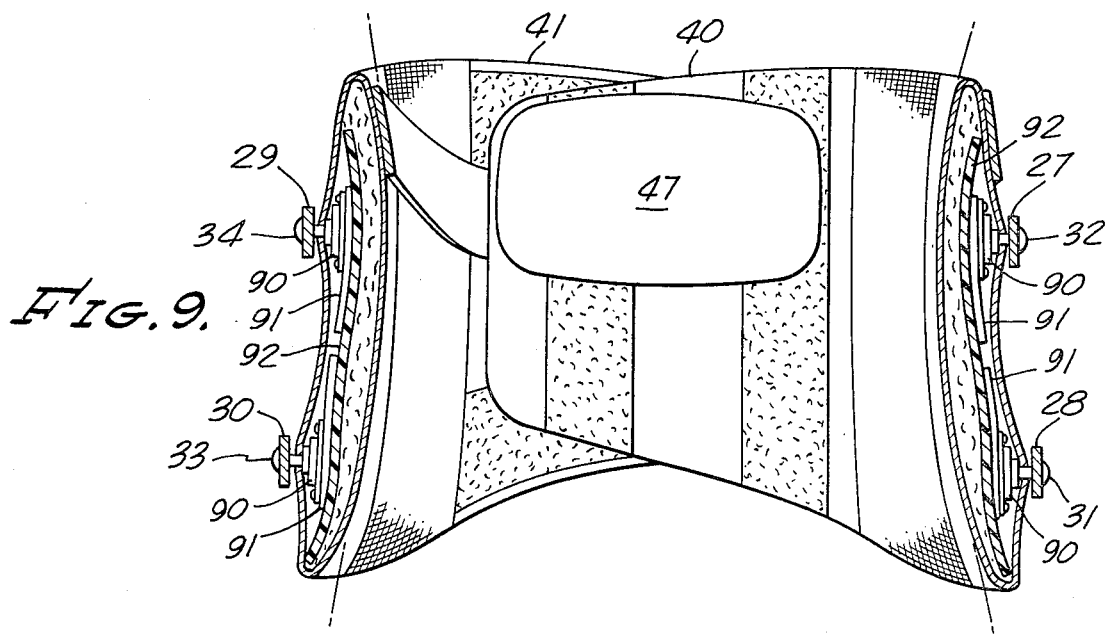
FIG. 9 is a sectional elevation taken substantially along the line 9—9 as shown in FIG. 8.

As best shown in FIG. 7, any tightening of straps 61 and 62, either by adjustment or by breathing in use, produces a front-to-back force or pressure but does not squeeze the wearer side-to-side or circumferentially which would produce discomfort. This is illustrated in FIG. 7 by the open areas "A" that remain between the cameraman's vest and the straps 61 and 62 by reason of the rigid frame 70 and the lateral extensions 52a, and 52b of plate 52. Also shown in FIG. 7 is the configuration of the padding 65 on transverse member 58 which rests against the back of the cameraman more clearly. Also shown in FIG. 7 is the means of joining shoulder member 18 to hip member 19 wherein the plate 52 fits into a pair of channels 63 and 64 on the interior of plate 50. A wing bolt 21a extends through a threaded socket 50a on plate 50 and into one of the holes 51, thus providing a secure connection. FIG. 8 shows the hip member of the harness and particularly the mode of positioning the padded portions 35 and 36 of the harness to ribs 27-30 by bolts 31-34. FIG. 9 shows the configuration of end portions 40 and 41 as they are aligned with resilient pad 47 in place in its filled form.

From the foregoing description it will be understood that the harness is used to support the weight of the camera and associated apparatus positioned in front of the cameraman, but the harness functions to place most of the vertical load on the hips and most of the horizontal load on the shoulders and upper back, thereby minimizing the effort expended and fatigue experienced by the cameraman.

Having fully described our invention, it is to be understood that we are not to be limited to the details herein set forth, but that our invention is of the full scope of the appended claims.

We claim:

1. In a body harness for carrying a camera assembly, the combination of a shoulder member and a hip member, said shoulder member comprising a central plate having connected thereto a pair of support members, said support members having a configuration conforming to the shoulders of a camera operator, said support members being connected to a transverse member having a pair of straps attached thereto and fastenable to the central plate, said hip member comprising a rigid frame, extending from the front of the cameraman to approximate with his hips, said frame having connected thereto a resilient padding extending from one hip of the cameraman to the other across the front of the body, said resilient padding having a fastening means whereby said resilient padding may be firmly tightened about the hips of said cameraman.

2. In a body harness for carrying a camera assembly in front of a cameraman, the combination of: a shoulder member having a relatively rigid padded frame adapted to extend over and rest upon the shoulders and adjacent the upper back of the cameraman, said shoulder frame being open across the chest and extending symmetrically across the cameraman's back and having lower wing portions adapted to extend around the sides of the cameraman's body, said shoulder frame having a central depending frontal element, relatively flexible straps for securing said lower wing portions to said frontal element, a hip member having curved relatively rigid padded structural parts adapted to extend across the lower abdomen and rest upon the hips of the cameraman, said hip member having a central upstanding element, means for supporting the camera assembly upon one of said elements, and means for releasably connecting said elements in any one of a plurality of relative vertical positions.

3. The combination set forth in claim 2 in which the camera assembly is carried upon the upstanding element on said hip member.

4. The combination set forth in claim 2 in which the latter said means is the only connection between the shoulder member and the hip member.

5. In a body harness for carrying a camera assembly in front of a cameraman, the combination of: a shoulder member having portions adapted to extend over and rest upon the shoulders and adjacent the upper back of the cameraman, said shoulder member having lower wing portions adapted to extend around the sides of the cameraman's body, said shoulder member having a central depending frontal element, chest straps securing said lower wing portions of said shoulder member to said central depending frontal element, a hip member having curved parts adapted to encompass and rest upon the hips of the cameraman, said hip member having a central upstanding element, means for releasably connecting said elements together, means for supporting the camera assembly upon said upstanding element, a pad positioned within said hip member to contact the lumbar region of the back of the cameraman, and releasable body-encircling parts securing said pad and a rear portion of said hip member to said upstanding element.

6. In a body harness for carrying a camera assembly in front of a cameraman, the combination of: a shoulder member having a relatively rigid padded frame adapted to extend over and rest upon the shoulders and adjacent the upper back of the cameraman, said shoulder frame being open across the chest and extending symmetrically across the cameraman's back, said shoulder frame having a central depending frontal element, relatively flexible straps for securing portions of said shoulder frame to said frontal element, a hip member having curved relatively rigid padded structural parts adapted to extend across the lower abdomen and rest upon the hips of the cameraman, each side of the relatively rigid hip member having at least one rib, a vibration isolating mount connecting each rib to a pad-supporting plate, said hip member having a central upstanding element, means for supporting the camera assembly upon one of said elements, and means for releasably connecting said elements in any one of a plurality of relative vertical positions.

7. The combination set forth in claim 6 in which each side of said hip member has a pair of diverging ribs, said vibration isolating mounts connecting each pair of diverging ribs to the same pad-supporting plate.

* * * * *